United States Patent
Suk

(10) Patent No.: US 10,241,571 B2
(45) Date of Patent: Mar. 26, 2019

(54) INPUT DEVICE USING GAZE TRACKING

(71) Applicant: VISUALCAMP CO., LTD., Daejeon (KR)

(72) Inventor: Yun Chan Suk, Seoul (KR)

(73) Assignee: VISUALCAMP CO., LTD., Daejeon (KR)

( * ) Notice: Subject to any disclaimer, the term of this patent is extended or adjusted under 35 U.S.C. 154(b) by 0 days.

(21) Appl. No.: 15/817,510

(22) Filed: Nov. 20, 2017

(65) Prior Publication Data

US 2018/0074583 A1    Mar. 15, 2018

Related U.S. Application Data

(63) Continuation of application No. PCT/KR2016/006323, filed on Jun. 15, 2016.

(30) Foreign Application Priority Data

Jun. 17, 2015  (KR) .......................... 10-2015-0085556

(51) Int. Cl.
*G06F 3/01* (2006.01)
*G06F 3/0484* (2013.01)
*G06F 3/023* (2006.01)
*G06F 3/0488* (2013.01)

(52) U.S. Cl.
CPC ............ *G06F 3/013* (2013.01); *G06F 3/0236* (2013.01); *G06F 3/04842* (2013.01); *G06F 3/04886* (2013.01)

(58) Field of Classification Search
CPC .... G06F 3/013; G06F 3/04886; G06F 3/0236; G06F 3/04842
See application file for complete search history.

(56) References Cited

U.S. PATENT DOCUMENTS

| 5,844,544 A | * | 12/1998 | Kahn ...................... G06F 3/013 345/156 |
| 2009/0249257 A1 | * | 10/2009 | Bove ................... G06F 3/04812 715/858 |
| 2011/0175932 A1 | | 7/2011 | Yu et al. |
| 2012/0086645 A1 | * | 4/2012 | Zheng ..................... G06F 3/013 345/168 |

(Continued)

FOREIGN PATENT DOCUMENTS

| KR | 10-2006-0017743 A | 2/2006 |
| KR | 10-2013-0102918 A | 9/2013 |

(Continued)

OTHER PUBLICATIONS

International Search Report for PCT/KR2016/006323.
Office action dated Aug. 31, 2016 from Korean Patent Office in a counterpart Korean Patent Application No. 10-2015-0085556.

*Primary Examiner* — John T Repsher, III
(74) *Attorney, Agent, or Firm* — The PL Law Group, PLLC

(57) ABSTRACT

An input device includes a display unit for displaying, on a screen, at least one key having a display region and a recognition region, a gaze tracking unit for calculating a gaze position of a user on the screen, and an input unit for determining, when the gaze position exists inside a recognition region of a particular key from among the at least one key, that a corresponding character in a display region of the particular key has been inputted.

8 Claims, 4 Drawing Sheets

(56) References Cited

U.S. PATENT DOCUMENTS

| | | | |
|---|---|---|---|
| 2012/0169607 A1* | 7/2012 | Tiitola | G06F 3/04886 345/173 |
| 2013/0169531 A1* | 7/2013 | Jahnke | G06F 3/013 345/158 |
| 2014/0002341 A1* | 1/2014 | Nister | G06F 3/013 345/156 |
| 2014/0049452 A1* | 2/2014 | Maltz | G06F 3/013 345/8 |

FOREIGN PATENT DOCUMENTS

| | | |
|---|---|---|
| KR | 10-2015-0005131 A | 1/2015 |
| KR | 10-2015-0032661 A | 3/2015 |

\* cited by examiner

INPUT DEVICE USING GAZE TRACKING

CROSS REFERENCE TO RELATED APPLICATIONS AND CLAIM OF PRIORITY

The present application is a continuation application to International Application No. PCT/KR2016/006323 with an International Filing Date of Jun. 15, 2016, which claims the benefit of Korean Patent Application No. 10-2015-0085556 filed on Jun. 17, 2015 at the Korean Intellectual Property Office, the disclosures of which are incorporated by reference herein in their entirety.

BACKGROUND

1. Technical Field

Embodiments of the present invention are related to input device technologies based on a user's gaze.

2. Background Art

Recently, the use of augmented reality equipment such as a Head Mounted Display (HMD) has been increasing as the virtual reality technology has emerged. However, most of the augmented reality equipment has a problem of visually obscuring the user's vision. Therefore, when the user wears the equipment, it is inconvenient to use a contact type input device such as a keyboard and a mouse. This is because it is difficult for the user wearing the augmented reality equipment to visually identify the key that is desired to be inputted. Also, when a person with a physical disability uses an information technology device, an input device that replaces a conventional contact type input device is needed.

Accordingly, a need for a new input means to replace the conventional contact type input device has been discussed.

SUMMARY

Embodiments of the present invention provide an input device using gaze tracking, including a display unit configured to display, on a screen, at least one key having a display region displaying a character and a recognition region visually distinguished from the display region; a gaze tracking unit configured to calculate a gaze position of a user on the screen; and an input unit configured to determine, when the gaze position exists inside a recognition region of a particular key from among the at least one key, that a character displayed in a display region of the particular key has been inputted.

When the gaze position exists inside the recognition region of the particular key from among the at least one key for a predetermined time or longer, the input unit may determine that the character corresponding to the display region of the particular key has been inputted.

When the gaze position of the user exists at a point within a predetermined range from the recognition region for a predetermined time or longer, the display unit may display the gaze position on the screen and move the displayed gaze position to the center of the recognition region.

The display unit may display an output window at the center of the screen to display an arrangement of inputted characters.

The input device may further include a recommendation unit configured to display a recommendation word that matches at least a part of the arrangement of the inputted characters. The display unit may display the recommendation word adjacent to a key corresponding to a last character of the arrangement of the inputted characters.

When the gaze position exists inside a display region of the recommendation word for a predetermined time or longer, the input unit may determine that the recommendation word has been inputted.

When the recommendation word is inputted, the recommendation unit may display an additional recommendation word that at least partially matches the recommendation word.

The display unit may display the additional recommendation word adjacent to the display region of the recommendation word.

DETAILED DESCRIPTION

Hereinafter, embodiments of the present invention are described with reference to the accompanying drawings. The following description is provided to aid in the comprehensive understanding of methods, devices, and/or systems disclosed in the particularities. However, the following description is merely exemplary and not provided to limit the present invention.

In the following description of the present invention, a detailed description of known functions and configurations incorporated herein will be omitted when it would make the subject matter of the present invention unclear. The terms used in the present specification are defined in consideration of functions used in the present invention, and can be changed according to the intent or conventionally used methods of clients, operators, and users. Accordingly, definitions of the terms should be understood on the basis of the entire description of the present specification. Terms used in the following description are merely provided to describe embodiments of the present invention and are not intended to be limiting of the inventive concept. As used herein, the singular forms "a," "an" and "the" are intended to include the plural forms as well, unless the context clearly indicates otherwise. It will be further understood that the terms "comprises" or "has" when used in this specification, specify the presence of stated features, integers, steps, operations, elements, or a portion or combination thereof, but do not preclude the presence or addition of one or more other features, integers, steps, operations, elements, or a portion or combination thereof.

Figure 1:
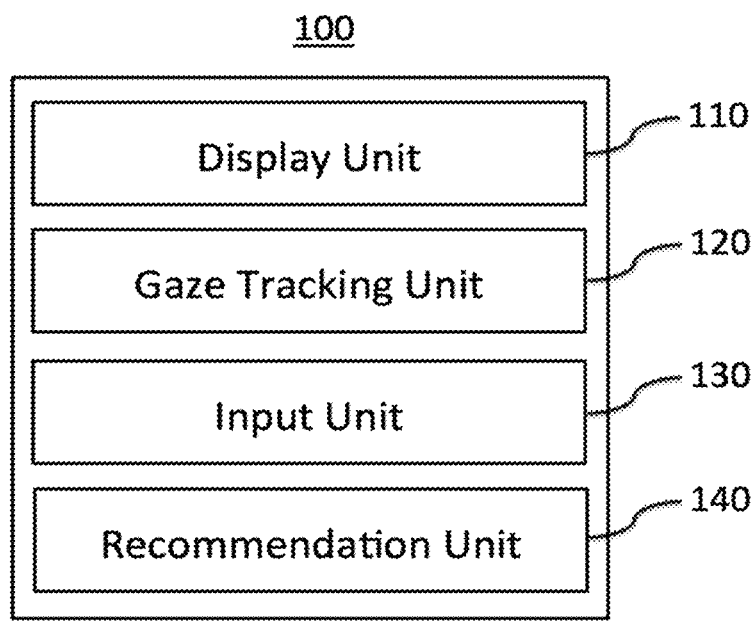
FIG. 1 is a diagram illustrating an input device according to an embodiment of the present invention.

FIG. 1 is a diagram illustrating an input device 100 according to an embodiment of the present invention.

The input device 100 according to an embodiment of the present invention refers to a device in which characters, numbers, symbols, images, control signals, and the like desired by a user are inputted by displaying a virtual keyboard on a display screen and tracking a gaze position of a user. The input device according to an embodiment of the present invention may be implemented in various types of electronic devices such as a smart TV, a smart phone, a PDA, a personal computer, a laptop computer, a virtual reality device worn on a user's head, a smart glass, and Head-Up Display (HUD).

Referring to FIG. 1, the input device 100 according to an embodiment of the present invention includes a display unit 110, a gaze tracking unit 120, and an input unit 130. In another embodiment, the input device 100 may further include a recommendation unit 140.

The display unit 110 displays at least one key on a screen using an image display means. The image display means generally includes an electronic display for providing visual information, such as a Liquid Crystal Display (LCD), an Organic Light-Emitting Diode (OLED) Display, a Cathode Ray Tube (CRT), and a Plasma Display.

In an embodiment, each key displayed on the image display means may include a display region and a recognition region. The display region is an area in which characters, numbers, symbols, emoticons, and the like are displayed for a user to identify keys displayed on the image display means. For example, when a character M is displayed in the display region, it means that the key is for inputting the character M. In embodiments of the present invention, the display region may have a size and color to be easily recognized by a user's eye.

The recognition region is an area for determining whether or not a user desires to input a character or the like displayed in the display region. In an embodiment, the recognition region may have a shape such as a circle or a polygon, but the present invention is not limited to a particular shape of recognition region. Further, the recognition region may be set to have a size sufficient to determine whether or not a gaze of a user is located inside thereof. If the size of the recognition region is too small, it may be difficult to determine whether the gaze of the user exists inside the recognition region using the gaze tracking unit 120 described later. Therefore, each recognition region may be set to have an appropriate size considering the accuracy of recognizing a gaze of a user, a size of the image display means, spacing of each key, and so on. In an embodiment, the recognition region may have a color or brightness distinct from a background and the display region on the screen.

According to an embodiment of the present invention, the display region and the recognition region displayed by the display unit 110 may be configured to be visually distinguished from each other. That is, the case where a gaze position of a user exists inside the display region and the case where a gaze position of a user exists inside the recognition region are clearly distinguished by the input device 100. Also, when a gaze position of a user moves from the display region to the recognition region, it is considered that the user intentionally moved her gaze. As a result, it is possible to distinguish between a movement of a gaze position of a user for searching for a key to be inputted and a movement of a gaze position of a user for inputting a key. This will be described later with reference to FIG. 3.

In an embodiment, the display unit 110 may display a current gaze position of a user on the screen. For example, the display unit 110 may display a cursor on the screen in the form of an arrow, a finger, or the like. A position of the cursor may be a position corresponding to a gaze position tracked by the gaze tracking unit 120, which will be described later. In another embodiment, the display unit 110 may be configured to display a gaze position only when a user watches a particular position for a predetermined time or longer, rather than always displaying the current gaze position of the user on the screen. For example, when a user gazes at a particular position on the screen for a predetermined time (for example, 0.5 seconds) or more, the display unit 110 may make the particular position sparkle or change the brightness, color, etc. of the particular position, thereby allowing the user know where the user is looking at. For example, when a user gazes at a key to be inputted but the gaze position is displayed outside the corresponding recognition region, the user can move the gaze position to the inside of the recognition region. In addition, when the gaze position is displayed inside the recognition region corresponding to a key to be inputted by a user, the user may maintain the gaze position.

In an embodiment, when the input unit 130 determines that a user has inputted a particular key, the display unit 110 may generate a notification message indicating that the particular key is inputted. The input unit 130 will be described later. For example, the display unit 110 may control a display region on the screen such that the display region displaying a corresponding character is visually enlarged for a predetermined time or the corresponding display region is displayed brightly. Also, the display unit 110 may generate a notification message using vibrations, sound effects, or the like in addition to the screen effect described above. It should be noted, however, that embodiments of the present invention are not limited to particular notification methods.

In an embodiment, when a gaze position of a user exists within a predetermined range outside a recognition region for a predetermined time or longer, the display unit 110 may display the gaze position on the screen and move the gaze position to the center of the recognition region. The user may set the range in which the user's gaze position is corrected by the display unit 110. For example, the user may set that the gaze position moves to the center of the recognition region when the gaze position exists for 0.3 seconds or longer within 2 mm from a boundary of the recognition region. Accordingly, even if a gaze position of a user deviates from a recognition region of a key to be inputted, the display unit 110 may correct the gaze position, thereby improving the accuracy of the input device 100. In addition, when a gaze position of a user is maintained after the gaze position of the user moves to the center of a recognition region of the key, the input unit 130, which will be described later, may determine that the corresponding key is inputted. That is, when the corrected gaze position exists inside the recognition region of the key to be inputted after the gaze position is corrected, the user may input the key by maintaining the gaze position. Further, when a gaze position moves to a recognition region of a key that a user does not intend to input, the user may not input the key by gazing at elsewhere.

The gaze tracking unit 120 tracks a gaze of a user and calculates the user's gaze position on the screen displayed by the display unit 110. Particularly, the gaze tracking unit 120 may collect gaze movement information of a user using various types of sensors or cameras and calculate the user's gaze position using the collected gaze movement information.

As examples of technology for tracking user's eyes, there are three methods, i.e., a video analysis method, a contact lens application method, and a sensor attachment method. The video analysis method is characterized by detecting movement of the eyeballs through analysis of images taken by a camera in real time and calculating the directions of pupils with respect to fixed positions reflected in corneas. The contact lens application method uses light reflected in contact lenses equipped with mirrors, a magnetic field of contact lenses equipped with coils, or the like. The contact lens application method is not convenient, but provides high accuracy. The sensor attachment method is characterized by attaching sensors near eyes to detect movement of the eyeballs to use an electric field dependent upon movement of the eyes. In the case of the sensor attachment method, movement of the eyes may be detected even when the eyes are closed (when sleeping, etc.). However, it should be understood that embodiments of the present invention are not limited to a particular eye tracking method or algorithm.

When a gaze position of a user calculated by the gaze tracking unit 120 exists inside a recognition region of a particular key, the input unit 130 determines that the user has inputted the corresponding key. For example, when a gaze of a user is located inside a recognition region of a key in which "K" is displayed in a display region, the input unit 130 may determine that the user has inputted "K". Hereinafter, to input a key means to input a character or the like displayed in a display region of a particular key.

In an embodiment, when a gaze position of a user exists inside a recognition region for a predetermined time or longer, the input unit 130 may determine that a key corresponding to the recognition region is inputted. For example, when a gaze of a user exists inside a particular recognition region for 0.2 seconds or longer, the input unit 130 may determine that a key corresponding to the recognition region is inputted. Therefore, even if the gaze position of the user stays in the recognition region without the intention of the user, an error that the input unit 130 determines that the corresponding character or the like has been input can be prevented.

The recommendation unit 140 may recommend a word to be inputted on the basis of characters inputted by a user and display the word on the screen. The word recommendation and the input of the recommended word by the recommendation unit 140 will be described in detail with reference to FIG. 4.

Figure 2:
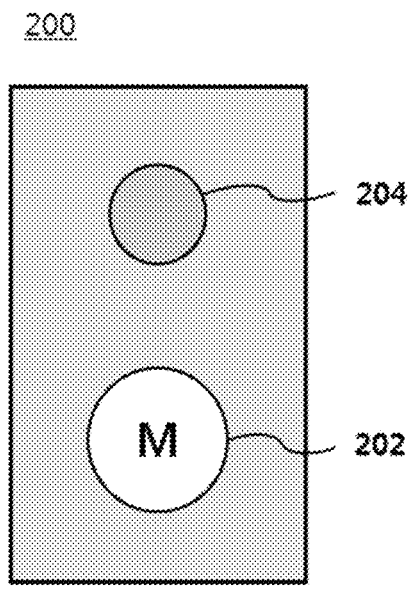
FIG. 2 illustrates a key displayed in an input device according to an embodiment of the present invention.

FIG. 2 is an illustration illustrating a key 200 displayed in the input device 100 according to an embodiment of the present invention. The key 200 according to an embodiment of the present invention includes a display region 202 and a recognition region 204. A user may identify the key 200 in the display region 202 and allow the input device 100 to input the key 200 by gazing at the corresponding recognition region 204.

Figure 3:
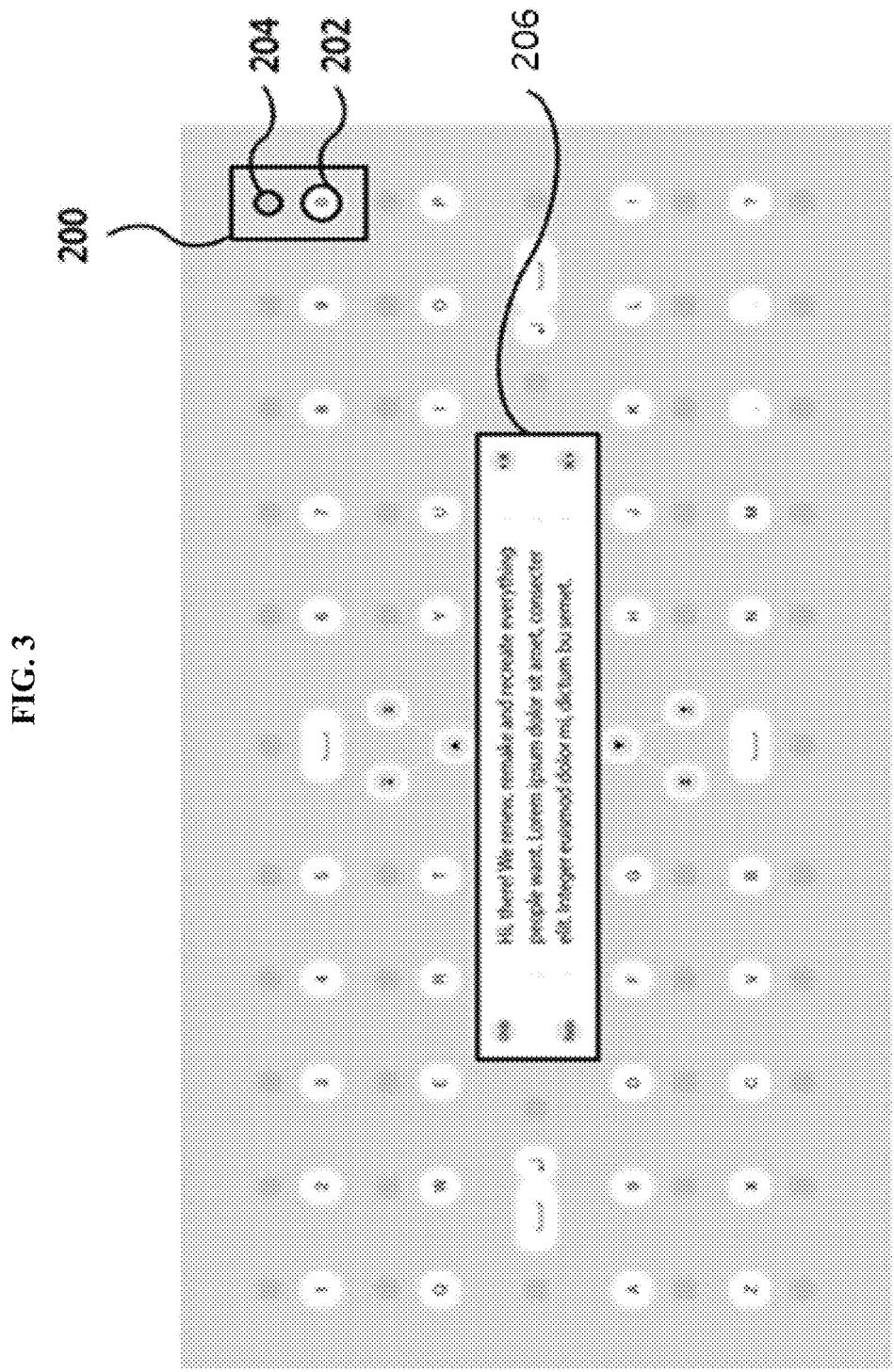
FIG. 3 illustrates a screen displayed in an input device according to an embodiment of the present invention.

FIG. 3 is an illustration illustrating the key 200 displayed in the input device 100 according to an embodiment of the present invention. According to FIG. 3, the key 200 displayed by the display unit 110 may include the display region 202, the recognition region 204, and the output window 206.

A particular character, a number, a symbol, an emoticon, and the like may be displayed in the display region 202. Further, the display region 202 is visually distinguished from the recognition region 204. Therefore, when a user is gazing at the display region 202 of the particular key 200, the input unit 130 does not determine that a character corresponding to the display region 202 that the user is looking at is inputted. The user may identify the key 200 with the display region 202 and input the corresponding character by gazing at the corresponding recognition region 204. That is, in an embodiment of the present invention, at least one key 200 displayed by the display unit 110 is divided into the display region 202 and the input area 204 respectively, so that the intention of the user can be clearly determined.

Particularly, in the case of a general input means such as a keyboard or a mouse, the recognition means and the input means are separated from the viewpoint of a user. For example, in the case of a mouse, a user senses a position of a cursor using a sense of sight (recognition means) and moves the mouse using a finger (input means). However, unlike the general input means, in the case of the input method using a gaze, both recognition means and input means use the sense of sight. In this case, when a user searches a keyboard on the screen for a desired key by using a gaze, it may be difficult for the input device to determine whether the user's gaze movement is only for searching for the key, or for inputting the key. Accordingly, in an embodiment of the present invention, the display region and the recognition region are distinguished from each other on the screen, so that the user may find the desired key by using the display region and input the key by using the recognition region thereby reducing the possibility of erroneous input due to the erroneous determination of the intention of a user.

The output window 206 is for displaying an arrangement of characters inputted by a user, and its shape and position on the screen are not limited. The display unit 110 according to an embodiment may display the output window 206 at the center of the screen 200 so that the user may easily identify it.

Figure 4:
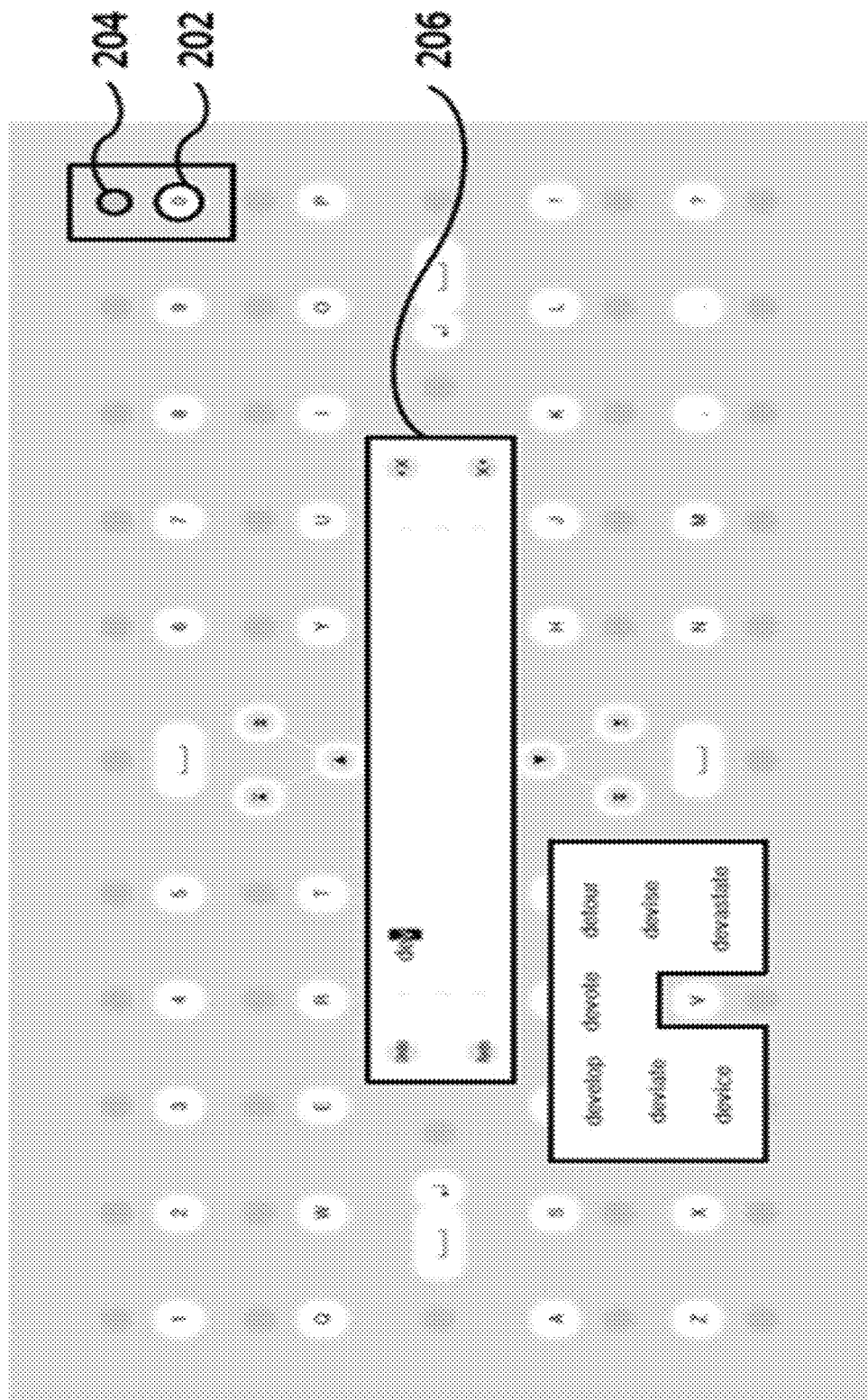
FIG. 4 illustrates a recommendation word displayed in an input device according to an embodiment of the present invention.

FIG. 4 illustrates a recommendation word displayed in the input device 100 according to an embodiment of the present invention.

The recommendation unit 140 may recommend a word having an arrangement of characters matching at least a part of an arrangement of the characters inputted by a user. For example, when characters entered by a user are 'd, e, v' in order, the recommendation unit 140 may recommend a word starting with "dev" such as "develop, deviate, device, devote," and so on. According to an embodiment of the present invention, the recommendation unit 140 may display a recommendation word around a key corresponding to the last character in an arrangement of characters inputted by a user. In the example described above, the recommendation unit 140 may display the recommendation words in a manner surrounding the last character 'v' among the characters inputted by the user. As a result, the user can shorten the input time of a word or sentence by selecting the recommended word while minimizing the movement of the gaze.

The input unit 130 may determine that, when a user gazes at a region for displaying a recommendation word, the user has inputted the recommendation word. The region for displaying the recommendation word may be distinguished from a region for displaying another recommendation word, and include the displayed recommendation word. In an embodiment, the input unit 130 may determine that a user has inputted the word when a gaze position of the user exists inside the region for displaying the recommendation word for a predetermined time or longer. A waiting time for the user to input the recommendation word may be the same as or different from a waiting time for inputting the general key. For example, the time may be set so that the input unit 130 allows for the user to input the recommendation word when the user gazes at the recommendation word for a longer time than when the user gazes at the recognition region 204 of the key.

Figure 5:
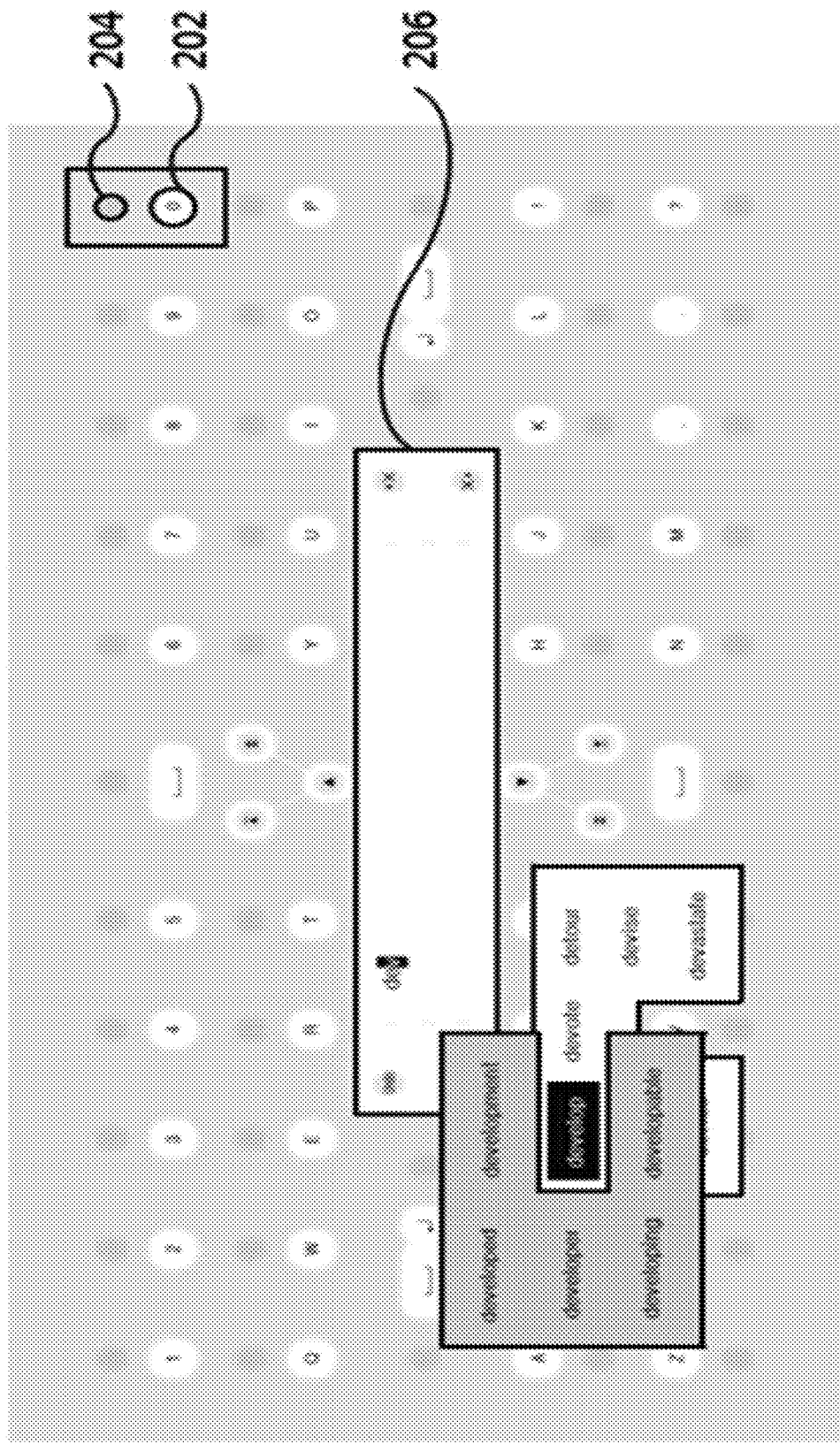
FIG. 5 illustrates an additional recommendation word displayed in an input device according to an embodiment of the present invention.

FIG. 5 illustrates an additional recommendation word displayed in the input device 100 according to an embodiment of the present invention.

In at least some embodiments, when the recommendation unit 140 determines that a user has inputted a recommendation word with the input unit 130, the recommendation unit 140 may display an additional recommendation word at least partially matching an arrangement of characters of the recommendation word. In the above example, if the user selects "develop," which is one of the recommended words, the recommendation unit 140 may display additional recommendation words such as "development, developer, and developing" based on the selected word. The additional recommendation words may be displayed adjacent to the recommendation word. For example, the recommendation unit 140 may display additional recommendation words adjacent to the display region of the recommendation word, and the additional recommendation words may surround the recommendation word in a shape of "U", "☐", "O", and the like. That is, in the above-described example, the additional recommendation word may be displayed around the previously selected word "develop" without dispersing the user's gaze. With such a configuration, the user can shorten the input time of a word or a sentence by selecting a recommendation word while minimizing the movement of the gaze.

As in the case of selecting a recommendation word, the input unit 130 may determine that a user has inputted an additional recommendation word when a gaze position of the user exists inside a region for displaying the additional recommendation word for a predetermined time or longer. The user may set a gazing time for taking an additional recommendation word to be inputted. For example, the time may be set so that the input unit 130 allows for the user to input the additional recommendation word when the user gazes at the additional recommendation word for a longer time than when the user gazes at the recognition region 204 of a key.

It should be noted that embodiments of the present invention are not limited to the number of times a word or phrase is recommended. For example, if a user selects an additional recommendation word, a word or phrase that matches at least some part of the additional recommendation word may be re-recommended.

Meanwhile, embodiments of the present invention may include programs for performing the methods disclosed herein on a computer and a computer-readable recording medium including the programs. The computer-readable recording medium can store program commands, local data files, local data structures or combinations thereof. The medium may be one which is specially designed and configured for the present invention or be one commonly used in the field of computer software. Examples of a computer readable recording medium include magnetic media such as hard disks, floppy disks and magnetic tapes, optical recording media such as CD-ROMs and DVDs, and hardware devices such as ROMs, RAMs and flash memories, which are specially configured to store and execute program commands. Examples of the programs may include a machine language code created by a compiler and a high-level language code executable by a computer using an interpreter and the like.

The exemplary embodiments of the present invention have been described in detail above. However, those skilled in the art will appreciate that various modifications, additions and substitutions are possible, without departing from the scope and spirit of the invention. Therefore, it should be understood that there is no intent to limit the invention to the embodiments disclosed, rather, the invention is to cover all modifications, equivalents, and alternatives falling within the spirit and scope of the invention as defined by the claims.

What is claimed is:

1. An input device implemented by an electronic device including at least one of a smart TV, a smartphone, a personal digital assistant (PDA), a personal computer, a laptop computer, a virtual reality device worn on a user's head, a smart glass, and a head-up display (HUD), comprising:
   a display unit configured to display, on a screen, a plurality of keys having a display region displaying a character and a recognition region visually distinguished from the display region, wherein the recognition region corresponding to the display region is apart from the display region on the screen, and the display unit includes at least one of a liquid crystal display (LCD), an organic light-emitting diode (OLED) display, a cathode ray tube (CRT), and a plasma display;
   a gaze tracking unit executed by a hardware device, the gaze tracking unit configured to calculate a gaze position of a user on the screen; and
   an input unit executed by the hardware device,
      wherein the input unit is configured to determine that a character displayed in a display region of a particular key from among the plurality of keys has been inputted when the gaze position exists inside a recognition region of the particular key from among the plurality of keys;
      the input unit is configured not to determine that the character displayed in the display region of the particular key from among the plurality of keys has been inputted when the gaze position exists inside the display region of the particular key from among the plurality of keys; and
      each key includes the display region and the recognition region respectively, and the display unit displays the display region and the recognition region of each key on the screen at the same time so that multiple keys sequentially have been inputted directly by the user without converting the screen; and
   wherein, when the gaze position of the user exists at a point within a predetermined range from the recognition region of the particular key from among the plurality of keys for a predetermined time or longer, the display unit moves the gaze position to a center of the recognition region of the particular key from among the plurality of keys.

2. The input device of claim 1, wherein, when the gaze position exists inside the recognition region of the particular key from among the plurality of keys for a predetermined time or longer, the input unit determines that a character corresponding to the display region of the particular key has been inputted.

3. The input device of claim 1, wherein, when the gaze position of the user exists at the point within the predetermined range from the recognition region of the particular key from among the plurality of keys for the predetermined time or longer, the display unit displays the gaze position on the screen and moves the displayed gaze position to the center of the recognition region of the particular key from among the plurality of keys.

4. The input device of claim 1, wherein the display unit displays an output window at a center of the screen to display an arrangement of inputted characters.

5. The input device of claim 4, further comprising a recommendation unit executed by the hardware device configured to display a recommendation word that matches at least a part of the arrangement of the inputted characters, wherein the display unit displays the recommendation word adjacent to a key corresponding to a last character of the arrangement of the inputted characters.

6. The input device of claim 5, wherein, when the gaze position exists inside a display region of the recommendation word for a predetermined time or longer, the input unit determines that the recommendation word has been inputted.

7. The input device of claim 6, wherein, when the recommendation word is inputted, the recommendation unit displays an additional recommendation word that at least partially matches the recommendation word.

8. The input device of claim 7, wherein the display unit displays the additional recommendation word adjacent to the display region of the recommendation word.

* * * * *